United States Patent
Shockley

(10) Patent No.: US 6,233,160 B1
(45) Date of Patent: May 15, 2001

(54) WATER/VAPOR PROOF MARINE FUSE BOX

(76) Inventor: James P. Shockley, 111 Willetts Ave., West Creek, NJ (US) 08092

( * ) Notice: Subject to any disclaimer, the term of this patent is extended or adjusted under 35 U.S.C. 154(b) by 0 days.

(21) Appl. No.: 09/438,622

(22) Filed: Nov. 12, 1999

(51) Int. Cl.[7] .................................................. H02B 1/04
(52) U.S. Cl. ........................ 361/833; 361/626; 361/835; 439/620
(58) Field of Search ............................. 361/833, 626, 361/630, 646, 835, 837; 439/620–622

(56) References Cited

U.S. PATENT DOCUMENTS

| | | | |
|---|---|---|---|
| 2,193,201 | * 3/1940 | Millermaster | 361/626 |
| 5,108,314 | * 4/1992 | Takano et al. | 439/621 |
| 5,670,928 | * 9/1997 | Cheng et al. | 361/833 |
| 5,973,418 | * 10/1999 | Ciesielka et al. | 307/130 |

* cited by examiner

*Primary Examiner*—Leo P. Picard
*Assistant Examiner*—Hung Van Duong
(74) *Attorney, Agent, or Firm*—Charles I. Brodsky

(57) ABSTRACT

A fuse box providing a weatherproof, waterproof long lasting enclosure which prevents moisture and especially air/water borne salt from corroding the within circuit block, fuses, and electrical wires, and which permits the easy addition of accessory circuits without destructive modification of the box. In a preferred embodiment, a plurality of pass-through openings are formed between facing edges of a fixed section of a non-corrosive case with a removable cut-out clamping section which secures to compress the electrical wires when installed—with the fuse box than being covered by a removable water/vapor tight lid.

8 Claims, 2 Drawing Sheets

WATER/VAPOR PROOF MARINE FUSE BOX

BACKGROUND OF THE INVENTION

1. Field of the Invention

This invention relates to electrical fuse panels installed or incorporated in such watercraft as motor boats and sail boats. More particularly, it relates to a water/vapor proof fuse box to protect against the round the clock exposure to water, mist, and salt air causing corrosion and malfunction of the circuit block, fuses, and wires contained therein.

2. Description of the Related Art

As is well known in the marine/boating industry, it is nearly impossible to keep any part of the boat—either inside the cabin, or on deck—from being exposed to moisture and salt air. Although electrical systems can be placed in areas that would not be prone to having water directly contact it, due to the boat being surrounded by the constant crashing of waves, both at sea and in the marina, water and salt hangs in the air in a fine mist, and travels throughout the boat as unrestricted as the air that is breathed. As a result, constant repair and replacement of electrical parts are necessary, as corrosion sets in quickly, seen as a greenish or white chalky coating at the electrical surfaces. The cost of parts and labor to address this on a yearly basis can amount to thousands of dollars—especially in larger boats. Also, if the owner does not maintain the boat, or is unaware of the ongoing corrosion, he or she can become stranded at sea should the electrical system breaks down as a result.

When new boats are constructed, on the other hand, they often leave the factory with a minimum of electrical systems. Other systems—such as radar, lighting, pumps, radios, for example—are then added by the owner or dealership, requiring additional wires and fuses to be linked into the main electrical panel. For this reason, manufacturers usually provide an oversize fuse panel with easy access to accommodate the addition of these options. This excess space, ease of access, and openings through which to run the various wires needed, permits the airborne water/salt air to infiltrate the fuse panel, settling on its contents and insides. As will be appreciated, these problems also exist where the boat is manufactured with several electrical systems present as original equipment.

OBJECTS OF THE INVENTION

It is an object of the invention, therefore, to provide a new and improved electrical fuse box which does not suffer the disadvantages of prior art designs.

It is an object of the invention, also, to provide such a fuse box which is both waterproof and vapor proof.

It is another object of the invention to provide an electrical fuse box which is particularly suited for use in the marine and boating industry.

SUMMARY OF THE INVENTION

As will become clear from the following description, the new and improved marine fuse box embodying the invention creates a water/vapor tight enclosure which enables the easy addition of accessory electrical systems, and which permits easy access to its contents by the user. As will also be seen, the marine fuse box of the invention accomplishes this in a manner which significantly extends the usable life of the fuse box and the fuses and electrical systems inside, without service or the need for replacement.

Thus, and in accordance with the invention, a water/vapor proof fuse box is constructed having a plurality of apertures of slightly smaller diameter than the diameter of marine grade electrical wire, to permit the addition of electrical systems to the manufactured boat in meeting the owners particular needs. The desired seal for the added wires and for the fuse box itself will be seen to be achieved by employing compression, clamps, gaskets, and silicon beading/caulking as the situation requires.

BRIEF DESCRIPTION OF THE DRAWINGS

These and other features of the invention will be more clearly understood from a consideration of the following description, taken in connection with the accompanying drawings in which.

DETAILED DESCRIPTION OF THE INVENTION

Figure 1:
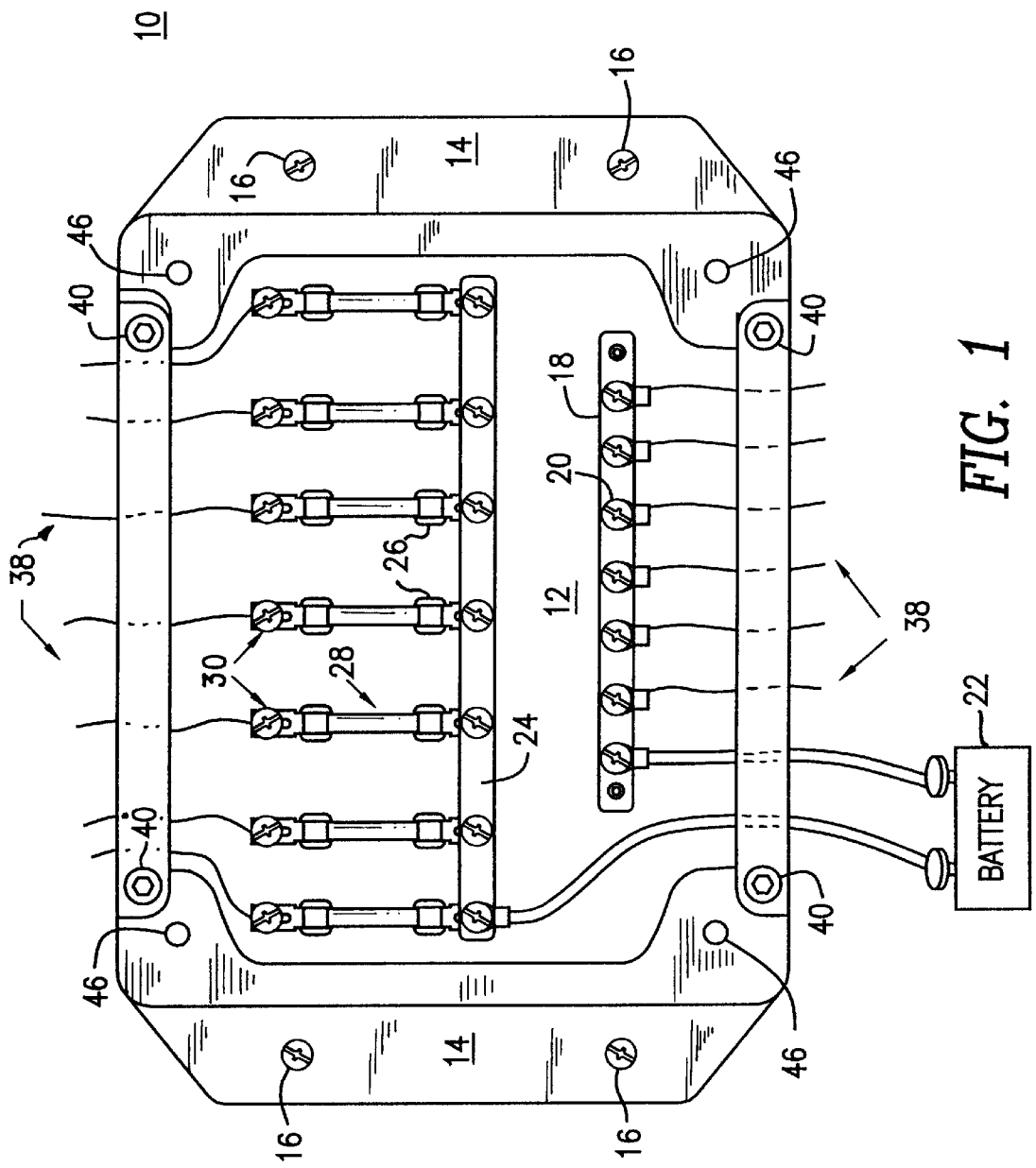
FIG. 1 is a top perspective view showing the fuse box of the invention with its cover removed, and with multiple electrical system accessories installed, along with securing clamps and sealing gaskets.
Figure 2:
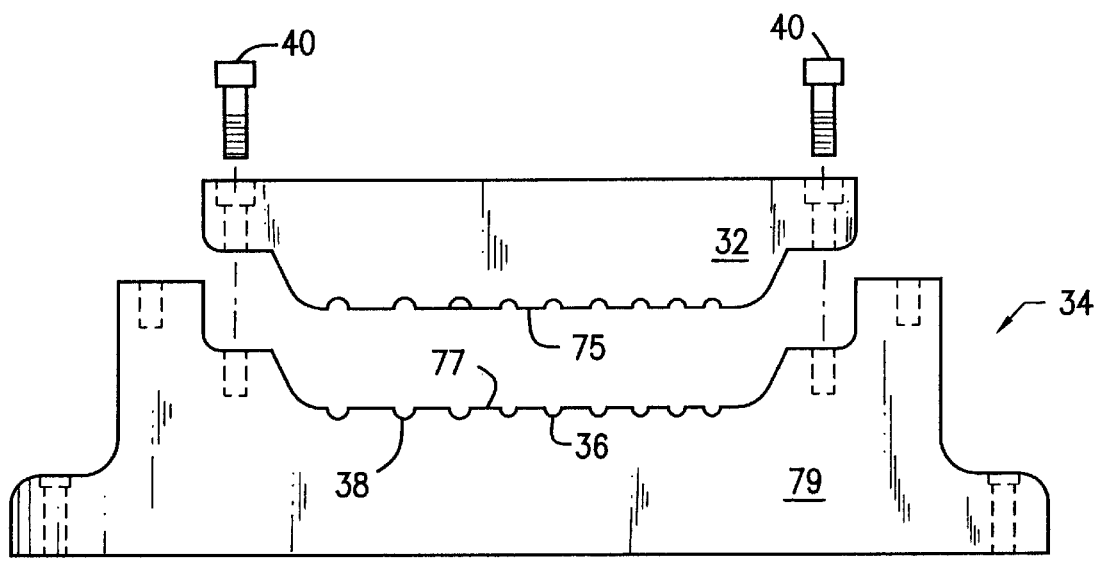
FIG. 2 is a side perspective view of the fuse box of FIG. 1, showing the removable wire clamp of the invention separated from the fuse box so as to permit installation of additional electrical accessories.
Figure 3:
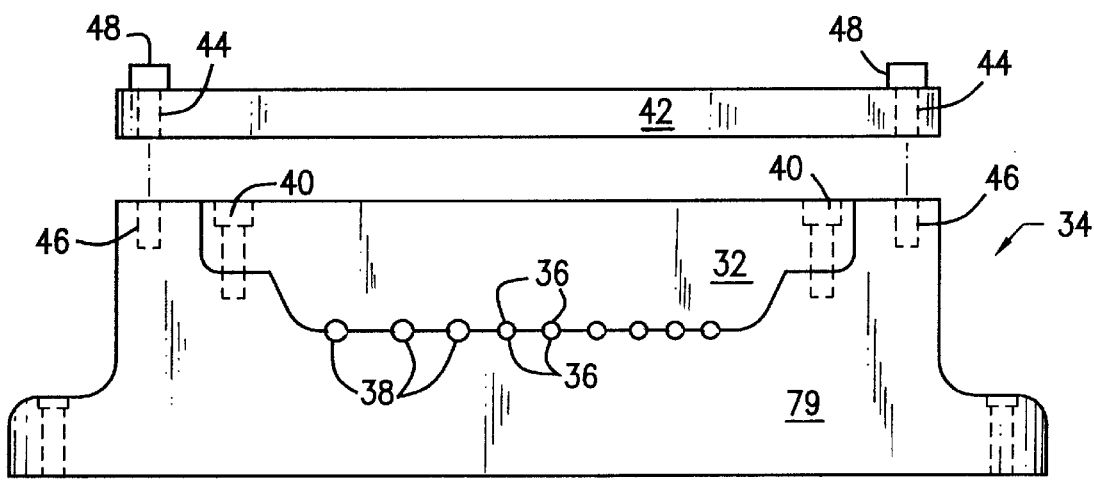
FIG. 3 is a side perspective view of the fuse box, showing the removable wire clamp installed to enclose the electrical wires which extend from the fuse box, and secured to accept the attachment of a lid in completely sealing the box.

As will be seen from the drawings, the water/vapor proof marine fuse box 10 according to the invention includes a non-corrosive case 12 having a pair of mounting flanges 14 for securing to a surface in the boat. The mounting flanges 14 have a plurality of pre-machined holes 16, also coated in an anti-corrosive finish, which extend through the mounting flanges 14, so as to permit the passing of a screw through the flange and into the desired surface. Attached at the bottom of the non-corrosive case 12 is a grounding bar 18, having a plurality of grounding screws 20, for the grounding of the installed electrical systems. The grounding bar 18, is connected to the negative terminal of the boats battery 22 so that all wires connected to the grounding bar 18, pass through to the battery. A positive bar 24 is additionally secured to the bottom of the non-corrosive case 12, separated from the grounding bar 18, with a plurality of attached fuse holders 26. The positive bar 24 is connected to the positive terminal of the battery 22 so that all wires connected thereto pass through to the battery, as well. Opposite the positive bar 24, and at a distance substantially equal to the length of a typical fuse 28, are corresponding fuse holders 26, each having a means 30 for securing electrical wires thereto. As shown in FIG. 2, the non-corrosive case 12 has a pair of cut-out clamping sections 32 in its side walls 34—one on either side—, which are removable to permit the insertion and compression of electrical wires. A plurality of wire holes 36 are pre-machined overlapping the bottom edge 75 of the cut-out clamping section 32, and into the top edge 77 of a fixed side section 79. The wire holes 36 are of a diameter slightly smaller than that of the standard marine electrical wire (shown at 38), so as to securely compress the wires when the cut-out clamping section 32 is secured to the facing fixed section 79 by tightening a pair of screws 40, as illustrated in FIG. 3. For an even more water/vapor proof seal around the electrical wires 38, a silicon gel can be applied to the inside of the wire holes 36, before attaching the cut-out clamping section 32.

A non-corrosive lid 42 is utilized as a cover for the fuse box, being substantially the same dimension as the top opening of the non-corrosive case 12, once the cut-out clamping sections 32 are secured in place. The non-corrosive lid 42 has a plurality of mounting holes 44, which align with a like number of threaded holes 46, located along the top edge of the case 12.

A thumb screw 48 is used to secure the non-corrosive lid 42 to the non-corrosive case 12 so as to be easily removed without the need for any tool to do so. To improve the seal between the lid and the case, a rubber gasket 57 is employed—as by placing it along the top of the non-corrosive case 12 prior to placing the non-corrosive top 42 in place for securing by the thumb screws 48.

When a boat manufacturer, dealership, aftermarket installer, or owner is planning to install an electrical system in the watercraft, with the fuse box of the invention they no longer have to place a fuse panel in a location which is most likely to stay dry as the fuse box will then be a water/vapor tight enclosure. This is important because once the watercraft is away from the marina, the user may need to have quick access to the fuses to restart any or all of the electrical systems.

While there has been described what is considered to be a preferred embodiment of the present invention, it would be readily appreciated by those skilled in the art that modifications can be made without departing from the scope of the teachings herein. For example, while a lid is described which employs screws to be secured to the top of the fuse box, a lipped, Tupperware-like, lid could be employed for even faster access. For at least such reason, therefore, resort should be had to the claims annexed hereto for a true understanding of the scope of the invention.

What is claimed is:

1. A water/vapor proof marine fuse box comprising: a non-corrosive case having a fixed section and a pair of cut-out sections to be clamped thereto in forming a plurality of pass-through openings for receiving electrical wires to be connected internally of said case; a plurality of attachment points within said case to receive said electrical wires and/or fuses; and a removable water/vapor tight lid covering said non-corrosive case; with said pair of cut out sections being temporarily removable for permitting insertion of said electrical wires through said pass-through openings and reinsertable for compressing said connected wires within said pass-through openings when clamped back in place to hold said wires secure and to limit water/vapor passage into said non-corrosive case via said openings.

2. The water/vapor proof marine fuse box of claim 1 wherein said plurality of pass-through openings are formed of a first part along an edge of said removable cut out clamping sections and of a second part along a facing edge of said fixed section overlapping therewith.

3. The water/vapor proof marine fuse box of claim 2 wherein said passthrough openings are of a dimension smaller in diameter than the diameter of electrical wires inserted therethrough, so as to compress said wires in a water/vapor tight fit.

4. The water/vapor proof marine fuse box of claim 2 wherein said removable cut-out clamping sections, after reinsertion, are securely held in place by a plurality of recessed screws to leave a flush surface with said fixed section.

5. The water/vapor proof marine fuse box of claim 2 wherein said removable water/vapor tight lid is securely held in place covering said case by a plurality of thumb screws.

6. The water/vapor proof marine fuse box of claim 2 wherein said non-corrosive case incorporates mounting flanges for attachment to a marine vehicle.

7. The water/vapor proof marine fuse box of claim 2 also including a silicon gel applied along said second part of said pass-through openings.

8. The water/vapor proof marine fuse box of claim 2 also including a rubber gasket between a top of said non-corrosive case and said water/vapor tight lid.

\* \* \* \* \*